United States Patent [19]

King

[11] Patent Number: 4,678,769

[45] Date of Patent: Jul. 7, 1987

[54] APPARATUS FOR CATALYST PREPARATION BY REACTIVE SUBLIMATION

[75] Inventor: Bonnie J. King, Houston, Tex.

[73] Assignee: Shell Oil Company, Houston, Tex.

[21] Appl. No.: 873,842

[22] Filed: Jun. 9, 1986

Related U.S. Application Data

[63] Continuation of Ser. No. 762,646, Aug. 5, 1985, abandoned.

[51] Int. Cl.[4] .......................... B01J 27/06; B01J 8/02
[52] U.S. Cl. .................................... 502/231; 422/193;
    422/202; 422/236; 422/239; 422/238; 423/492;
                                                     502/224
[58] Field of Search ............... 422/148, 191, 193, 195,
        422/202, 208, 236, 238, 239, 219; 423/492;
                                       502/231, 224, 353, 354

[56] References Cited

U.S. PATENT DOCUMENTS

| | | | |
|---|---|---|---|
| 1,918,080 | 7/1933 | Beardsley | 422/191 |
| 2,310,907 | 2/1943 | McMillan | 422/219 |
| 2,369,478 | 2/1945 | Mekler et al. | 422/191 |
| 3,477,828 | 11/1969 | Schulze et al. | 422/148 |
| 4,180,543 | 12/1979 | Ward | 422/191 |
| 4,467,048 | 8/1984 | Johnson | 502/534 |
| 4,489,171 | 12/1984 | Johnson | 502/231 |

FOREIGN PATENT DOCUMENTS 54-32177  3/1979  Japan .................................. 422/191

Primary Examiner—Michael S. Marcus
Attorney, Agent, or Firm—Pamela J. McCollough

[57] ABSTRACT

The invention relates to an apparatus for preparing tantalum halide supported catalysts which comprises a container for holding the support, a container for holding the tantalum pentahalide, a heating means to provide the proper temperature for reactive sublimation, and an optional means for transferring vapor from the halide container.

4 Claims, 1 Drawing Figure

APPARATUS FOR CATALYST PREPARATION BY REACTIVE SUBLIMATION

This is a continuation of application Ser. No. 762,646 filed Aug. 5, 1985 now abandoned.

FIELD OF THE INVENTION

This invention relates to an apparatus used to prepare tantalum and/or niobium halide supported catalysts.

BACKGROUND OF THE INVENTION

Tantalum and/or niobium halide supported catalysts are known to be useful in various organic reactions. The compositions of these catalysts are more fully described in U.S. Pat. No. 4,480,049 and U.S. Pat. No. 4,489,171. These catalysts are not prepared utilizing the usual techniques of impregnation, but instead are prepared utilizing a method of preparation called "reactive sublimation". It is therefore useful to have a device which can be used to prepare catalysts in this manner. A device for preparing catalysts by reactive sublimation has been designed wherein tantalum and/or niobium pentahalide is sublimed and the vapor therefrom is reacted with a suitable support to produce a supported tantalum and/or niobium halide catalyst.

SUMMARY OF THE INVENTION

This invention relates to an apparatus for preparing tantalum and/or niobium halide supported catalysts by a reactive sublimation method. In general terms, the apparatus comprises a container for holding the support, a container for holding the tantalum and/or niobium pentahalide, a heating means to provde the proper temperature for reactive sublimation and an optional means for transferring vapor from the halide container to the support container.

More specifically, the apparatus comprises a first sealed hollow tube having contained therein a second tube for the catalyst support having a permeable top and bottom, a spacing means and a third tube for the tantalum and/or niobium halide having a permeable top and bottom which is separated from the second tube by said spacing means. Means are provided for heating said second tube and said third tube. Means are also provided for vacuum as well as gas input and gas out-take. The invention provides for a catalyst apparatus designed to prepare large amounts of tantalum and/or niobium halide catalyst in a single unit.

DESCRIPTION OF THE PREFERRED EMBODIMENTS

Figure 1:
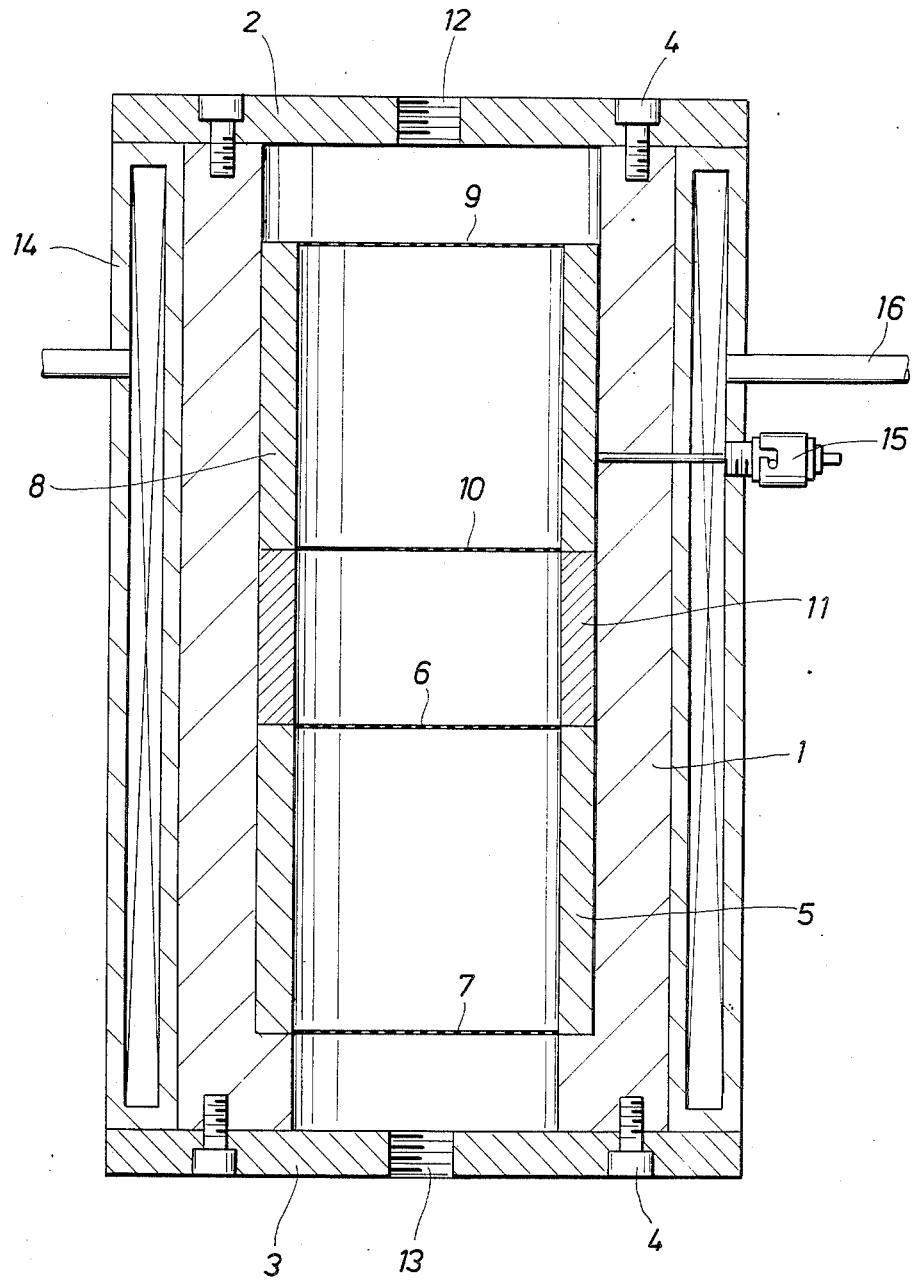
FIG. 1 is a schematic of the apparatus of the instant invention which is used for making a tantalum and/or niobium halide supported catalyst by reactive sublimation.

The apparatus of the instant invention is described below with reference to the drawings and with reference to its use for preparing tantalum and/or niobium halide supported catalysts.

"Downwardly", "down" and the like has been used in this specification to indicate a direction and not an orientation and hence should not be construed to imply an orientation limitation on the instant invention. A downwardly series flow of gas through the apparatus is the usual pattern; however, one could invert the apparatus conceptually and put gas in at the bottom. These differing apparatus configurations, as well as others apparent to those skilled in the art, are deemed to be within the scope of this invention.

Referring to FIG. 1, Items 1, 2 and 3 on the drawing comprise a sealed hollow tube. Item 1 is the hollow tube, Item 2 is a sealable plate contained on the top of tube 1 and Item 3 is a sealable plate contained on the bottom of tube 1. Materials of construction such as stainless steel, for example, are selected for use with metal halides since they tend to be corrosive. In the specific embodiment shown, plates 2 and 3 are fastened by tube 1 by a series of screws (Item 4). Other fastening means will be readily apparent to one skilled in the art. For example, the plates and the tube may be suitably threaded and the plate then screwed on the tube. Alternatively, clamps may be utilized to hold the plates onto the tube. Item 5 represents a second tube which contains the catalyst support and which fits inside tube 1. In a preferred embodiment, the outer wall of the catalyst support tube is slightly smaller than the inner wall of tube 1 which will allow tube 5 to slide smoothly into tube 1 but will now allow excess gas to pass between the walls of tubes 1 and 5. The top and bottom of the catalyst support tube, 6 and 7, comprise porous membranes. One or both of these membranes may be removable. The membranes may be screens or any other suitable form of baffling which will allow passage of gas but will not allow passage of catalyst pellets through the membrane.

Placed inside tube 1 and on top of the second tube, Item 5, is a third tube, Item 8, which contains the tantalum and/or niobium halide. In a preferred embodiment, the outer wall diameter of the third tube 8, is the same as that of the second tube, 5. The top and bottom of the tantalum and/or niobium halide tube, 9 and 10, are similar to the top and bottom of the catalyst support tube and are porous membranes which allow passage of gas but will not allow passage of tantalum halide powder, pellets, or particles through the membrane. One or both of these membranes may be removable.

Tube 5 and tube 8 are separated by a spacing means represented here by tube 11 to allow for the expansion and dispersion of tantalum and/or niobium halide-containing gas. The spacing means may be, for example, rings or pins as well as any other means having a substantially open center extending across the inner diameter of tube 5 and tube 8.

Access ports 12 and 13 typically provide for entry of carrier gas into tube 1 and exit of carrier gas from tube 1. Alternatively, when vacuum rather than carrier gas is utilized in making the catalyst, one of the ports may provide an access port for vacuum. Preferably, there is sufficient space between access 12 and tube 8 to allow for even distribution of gas. In subsequent treatments of the supported tantalum and/or niobium halide, liquid may be present in tube 1 which is removed via access 13 where it flows to a knockout pot and is chilled to remove vapors and thus prevent contamination of the catalyst.

Item 14 represents a means for heating tube 1. The heating means may be, for example, a jacket or any other suitable heating means. Thermocouple 15 appropriately located in the heating means is utilized to monitor and control the temperature. In a preferred embodiment, the heating means surrounds tube 1. Also suitable, however, are separate heating means with tube 5, spacer 11 and tube 8 each having a means for heating.

Item 16 represents a means for mounting the apparatus. Various means of mounting such as, for example, pins, bolts and clamps, etc., attached to a stand or other holder which allow for rotation of tube 1 are suitable. Preferably, the mounting means is attached to a stand or other suitable holder and acts as a hinge enabling tube 1 to rotate in order to facilitate loading of the container.

In operation, tube 5 is loaded by removing one of the membranes, 6 or 7, located at the top or bottom of tube 5 and inserting the support in the tube. The support may be, for example, silica, alumina, silica-alumina and the like. Tube 8 is loaded by removing one of the membranes, 9 or 10, located at the top or bottom of tube 8 and inserting the tantalum and/or niobium pentahalide in the tube. Preferably, the tantalum and/or niobium pentahalide is loaded into tube 8 inside a drybox to avoid exposure to air. The halide is selected from the group consisting of fluoride, chloride, bromide, iodide and mixtures thereof. Preferred halides are fluoride and chloride. Tubes 5 and 8 are placed inside tube 1, which is then sealed. The tantalum and/or niobium pentahalide sublimation then begins by application of temperature and/or vacuum. Any temperature and/or vacuum which causes the tantalum and/or niobium pentahalide to sublime is suitable. Temperatures ranging from about 140° C. to about 230° C. are preferred. Sublimation of the tantalum and/or niobium pentahalide is used to put the pentahalide in the vapor state. The tantalum and/or niobium pentahalide vapor is then reacted with the support. Vacuum may be used, but in a preferred embodiment, an inert gas such as, for example, nitrogen is introduced into the apparatus via access 12 as a carrier to bring the sublimed tantalum and/or niobium pentahalide into contact with the support. Contact times may vary and can be readily determined by routine experimentation. When the reaction is complete, any remaining gas and/or liquid flows out access port 13 to prevent contamination of the catalyst.

A variation of the above process can be utilized to produce a catalyst containing mixed halides, particularly mixed chlorides and fluorides. In this process, sublimed tantalum and/or niobium pentachloride is contacted with a support followed by contact with a fluorinated hydrocarbon. This results in at least a partial exchange of fluorine for chlorine. Reaction temperatures and pressures for reactions with fluorinated hydrocarbons are not critical. In general, temperatures of room temperature or greater are suitable. Different fluorinated hydrocarbons will have different optimum temperatures, pressures and times of contact, and these can be readily determined by routine experimentation. Particularly suitable fluorinated hydrocarbons are the Freons such as, for example, Freon 12 ($CF_2Cl_2$), Freon 14 ($CF_4$), Freon 23 ($CHF_3$), Freon 112 ($CCl_2F-CCl_2F$), Freon 116 ($CF_3-CF_3$) Freon 142 (chlor-difluor-methyl methane), Freon C138 (octafluorocyclobutane) and similar materials.

Another variation of the above process can be utilized to produce a catalyst with reduced activity. In this process, sublimed tantalum and/or niobium pentachloride is contacted with a support followed by contact with oxygen or oxygen-containing compounds, resulting in a replacement of some of the chlorine with oxygen.

The catalysts made utilizing the apparatus of the instant invention are useful for hydrocarbon conversions such as, for example, alkylation reactions, isomerization reactions, oligomerization reactions, etc.

I claim:
1. A process for preparing tantalum and/or niobium halide supported catalysts utilizing an apparatus which comprises:
   (a) a sealed hollow first tube having a top and a bottom, said first tube having an inlet port at the top of said first tube and an outlet port at the bottom of said first tube,
   (b) a second tube having a top and a bottom, said second tube being fitted tightly inside said first tube and located at the bottom of said first tube, said second tube having a porous membrane at the top and bottom of said second tube whereby gas is permeable and catalyst pellets are not permeable through said porous membrane,
   (c) a spacing means,
   (d) a third tube having a top and a bottom, said third tube being fitted tightly inside said first tube and separated from said second tube by said spacing means, said third tube having a porous membrane at the top and bottom of said third tube whereby gas is permeable,
   (e) a means for heating (b) and (d) to adjust the temperature of said second and third tubes,
which process comprises: placing a catalyst support selected from the group consisting of silica, alumina and silica-alumina into said second tube, placing tantalum and/or niobium halide into said third tube, passing gas into said inlet port of said first tube and out at said outlet port of said first tube, subliming said tantalum and/or niobium halide by heating said third tube at a temperature ranging from about 140° C. to about 230° C. to form a tantalum and/or niobium halide vapor, and allowing said tantalum and/or niobium vapor to pass through said spacing means to allow expansion and dispersion of said tantalum and/or halide vapor into said second tube and contact with said catalyst support for a length of time sufficient to yield a tantalum and/or niobium halide supported catalyst.

2. The process of claim 1 wherein said second tube is heated to a temperature ranging from about 140° C. to about 230° C.

3. A process for preparing tantalum and/or niobium halide supported catalysts utilizing an apparatus which comprises:
   (a) a sealed hollow first tube having a top and a bottom, said first tube having an inlet port at the top of said first tube and an outlet port at the bottom of said first tube,
   (b) a second tube having a top and a bottom, said second tube being fitted tightly inside said first tube and located at the bottom of said first tube, said second tube having a porous membrane at the top and bottom of said second tube whereby gas is permeable and catalyst pellets are not permeable through said porous membrane,
   (c) a spacing means,
   (d) a third tube having a top and a bottom, said third tube being fitted tightly inside said first tube and separated from said second tube by said spacing means, said third tube having a porous membrane at the top and bottom of said third tube whereby gas is permeable,
   (e) a means for heating (b) and (d) to adjust the temperature of said second and third tubes,
which process comprises: placing a catalyst support selected from the group consisting of silica, alumina and silica-alumina intol said second tube, placing tantalum and/or niobium halide into said third tube, applying vacuum to said inlet port of said first tube or said outlet port of said first tube, subliming said tantalum and/or niobium halide by heating said third tube at a temperature ranging from about 140° C. to about 230° C. to form a tantalum and/or niobium halide vapor, and allowing said tantalum and/or niobium vapor to pass through said spacing means to allow expansion and dispersion of said tantalum and/or halide vapor into said second tube and contact with said catalyst support for a length of time sufficient to yield a tantalum and/or niobium halide supported catalyst.

4. The process of claim 3 wherein said second tube is heated to a temperature ranging from about 140° C. to about 230° C.

* * * * *